Patented June 7, 1938

2,119,657

UNITED STATES PATENT OFFICE 2,119,657

METHOD OF TREATING LIQUID EGG WHITES

Samuel Tranin, Kansas City, Mo.

No Drawing. Application February 5, 1937, Serial No. 124,241

6 Claims. (Cl. 99—113)

This invention relates to a method of treating egg whites, and particularly to reclamation of egg white remaining within and adhering to egg shells. For example, in the commercial breaking of eggs the shells are severed and the contents emptied into receptacles for subsequent processing. Some of the white adheres to the shells and the operators do not allow sufficient time for the egg white to drain, consequently a portion of the egg white is lost and discharged with the shells.

Heretofore attempts have been made to salvage this portion of the egg whites, but because of dirt, germs and bacterial growths on the shells, the egg white readily spoils. I have, therefore, devised a process whereby this ordinarily wasted portion of the egg may be treated to render it as pure and wholesome and as suitable for use as the portions of the egg whites that were originally emptied from the shells.

In carrying out the invention, I separate the egg white from the shells and treat the egg white with a filtering medium in conjunction with a sterilizing solution. The sterilizing solution purifies the egg white and destroys contained organisms, bacteria, and the like, while the filtering medium rises through the egg white to carry with it most of the contained foreign matter. The filtering medium carrying the foreign matter is readily removed by a skimming process, leaving liquid egg white which is further purified by an acid treatment to assure quality of the finished product.

In practicing the process, the adhering egg whites are removed from the egg shells by placing the discarded egg shells within a centrifugal extractor wherein they are revolved with sufficient velocity to effect centrifugal separation of the liquid white, which is discharged from the extractor and collected in a suitable treating vat wherein the egg is subjected to the filtering and sterilizing mediums.

For the filtering medium I use a gelatine solution prepared by dissolving an ordinary gelatine in water in the proportion of 1 pound of gelatine to 20 pounds of warm water at approximately 110° temperature. This solution is then added to the liquid egg white and thoroughly mixed therewith in the proportion of about 5 pounds solution to 750 pounds of egg white. For the sterilizing solution I use chlorine, having a ratio of 1 to 50, and add 1½ gallons of the chlorine solution to the 750 pounds of egg whites. After adding the chlorine solution to the gelatine egg mixture, the batch is thoroughly mixed and then allowed to set for about 8 hours. During this period the chlorine acts to sterilize the egg white, killing the bacteria and other organisms contaminating the egg. The gelatine solution rises through the liquid egg and carries with it dirt and other contained foreign matter, which collects with the gelatine on the top of the liquid egg. This matter is then skimmed from the liquid egg, after which the liquid egg is treated with an acid solution that has been preferably prepared by dissolving acid crystals, such as tartaric or lactic acid, to form an 85 to 95% acid solution. The acid solution is then added to the egg white in proportion of 4% by weight, and allowed to stand for a period of time to permit the acid solution to react and effect separation of any of the objectionable foreign matter that is left in the egg white. This matter rises to the top and leaves a clarified body of liquid egg entirely free from the objectionable and odoriferous matter.

The acid solution not only acts as a clarifier in the further purification of the egg, but also acts as a preservative to prevent fermentation. The purified egg may then be processed by dehydration either by spraying it in the presence of heat or by heating it in thin batches which, after drying, may be broken into flakes.

The chlorine solution may be in liquid form as above described or in gaseous form and caused to move through the liquid egg. It is also obvious that the chlorine may be in any of the commercial forms whereby it may be administered in a facile manner.

What I claim and desire to secure by Letters Patent is:

1. The method of reclaiming contaminated liquid egg including subjecting the liquid egg to the filtering action of a filtering gelatine solution to effect separation of contaminating matter, treating the liquid egg with a chlorine solution for sterilization of the liquid egg, and removing the separated matter from the liquid egg.

2. The method of reclaiming contaminated liquid egg including subjecting the liquid egg to the filtering action of a gelatine solution in conjunction with a chlorine solution to effect separation of contaminating matter and sterilization of the liquid egg, and removing the separated matter from the liquid egg.

3. The method of reclaiming contaminated liquid egg including subjecting the liquid egg to the filtering action of a gelatine solution to effect separation of contaminating matter, treating the liquid egg with a chlorine solution for sterilization of the liquid egg, removing the separated matter from the liquid egg, and subjecting the liquid egg to an acidifying solution for effecting separation of any contaminating matter not removed by the gelatine solution.

4. The method of reclaiming contaminated liquid egg including subjecting the liquid egg to the filtering action of a gelatine solution in conjunction with a chlorine solution to effect separation of contaminating matter and sterilization of the liquid egg, removing the separated matter from the liquid egg, and subjecting the liquid egg to an acidifying solution for effecting separation of any contaminating matter not removed in the filtering step.

5. The method of reclaiming egg white from egg shells including centrifuging the egg shells to effect separation of the liquid egg, collecting the liquid egg, subjecting the liquid egg to the filtering action of a gelatine solution in conjunction with a chlorine solution to effect separation of contaminating matter maintained in suspension in the liquid egg after centrifuging, and removing the separated contaminating matter including the filtering solution.

6. The method of reclaiming egg white from egg shells including centrifuging the egg shells to effect separation of the liquid egg white, collecting the liquid egg white, subjecting the liquid egg white to the filtering action of a gelatine solution in conjunction with a chlorine solution to effect separation of contaminating matter remaining in suspension in the liquid egg white and sterilization of the liquid egg white, removing the separated contaminating matter including the gelatine solution, acidifying the liquid egg white to effect separation of any contaminating matter remaining in the liquid egg white, and removing the matter separated in the acidifying step.

SAMUEL TRANIN.